(12) United States Patent
Robinson et al.

(10) Patent No.: US 6,937,782 B2
(45) Date of Patent: Aug. 30, 2005

(54) POLARIZATION-STABILIZED ALL-OPTICAL SWITCH

(75) Inventors: Bryan S. Robinson, Belmont, MA (US); Shelby J. Savage, Cambridge, MA (US); Scott A. Hamilton, Newton, MA (US); Erich P. Ippen, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 120 days.

(21) Appl. No.: 10/420,501

(22) Filed: Apr. 22, 2003

(65) Prior Publication Data

US 2004/0037489 A1 Feb. 26, 2004

Related U.S. Application Data

(60) Provisional application No. 60/378,746, filed on May 8, 2002.

(51) Int. Cl.$^7$ ................................................ G02B 6/26
(52) U.S. Cl. ............................. 385/16; 385/47; 385/19
(58) Field of Search ............................ 385/16, 14, 19, 385/31, 39, 47

(56) References Cited

U.S. PATENT DOCUMENTS 6,072,811 A * 6/2000 Fermann et al. ............... 372/11
H1926 H * 12/2000 Carruthers et al. ............ 372/6
6,665,456 B2 * 12/2003 Dave et al. .................... 385/11

OTHER PUBLICATIONS

Morioka et al. Utrafast reflective optical kerr demultiplexer unsing polarization rotation mirror, Elec. Letters., Mar. 12, 1992, vol. 28, No. 6.*

Morioka et al., Ultrafast Reflective Optical . . . , Electronic Letters, Mar. 12, 1992, p. 521–2 vol. 28 No. 6.

Robinson et al., 40Gbit/s All–Optical XOR . . . , Tech. Digest–Optical Fiber Communication . . . , Mar. 21, 2002.

Savage et al., All–optical pulse regeneration . . . , Technical Digest–Conferance on Lasers . . . , May 9, 2001.

Shake et al., Vibration–Insensitive Nonlinear Optical . . . Photonics Technology Letters, May 2000, p. 555–7.

Vinegoni et al., Measurements of Nonlinear Coeficients . . . , Photonics Technology Letters, Dec. 12, 2001.

Vinegoni et al., Implementation of a Faraday Mirror Stabilization . . . Icton 2000, p. 187–190, IEEE.

Vinegoni et al., Determination of nonlinear coefficeint . . . , Electronic Letters, May 11, 2000, p. 886–8.

Vinegoni et al., All–Optical switching in a highly . . . , Optics Communications, Aug. 15, 2000, p. 335–341.

* cited by examiner

Primary Examiner—Kianni C. Kaveh
(74) Attorney, Agent, or Firm—Guerin & Rodriguez, LLP; William G. Guerin

(57) ABSTRACT

Described is an all-optical switch that is significantly insensitive to polarization instabilities. The optical switch can be configured as an ultrafast logic gate, a switch for ultrafast communication systems or a key component of an all-optical regenerator. Performance is independent of the statistical characteristics of the data controlling the switch. The switch includes a birefringent optical channel in communication with one end of a nonlinear optical channel through a coupler and a polarization rotation mirror in communication with the other end of the nonlinear channel. An optical data pulse for controlling the switching function is provided to one port of the coupler.

22 Claims, 9 Drawing Sheets

POLARIZATION-STABILIZED ALL-OPTICAL SWITCH

CROSS REFERENCE TO RELATED APPLICATIONS

This application claims priority to provisional U.S. patent application Ser. No. 60/378,746, filed May 8, 2002, titled "Polarization Stabilized All-Optical Switch," the entirety of which provisional application is incorporated by reference herein.

GOVERNMENT RIGHTS IN THE INVENTION

This invention was made with United States government support under Contract No. F19628-00-C-002 awarded by the Defense Advanced Research Project Agency (DARPA). The government may have certain rights in the invention.

FIELD OF THE INVENTION

The invention relates generally to optical switches. More specifically, the invention relates to devices and methods for regeneration and switching in high data rate optical communication systems.

BACKGROUND

Typical optical networks are based on high-speed electronic routers interconnected by optical fiber links utilizing wavelength division multiplexing (WDM) transmission systems. To achieve packet routing, the optical signal entering the router is converted to an electrical signal (O/E conversion) and demultiplexed into lower-rate data streams. The data streams are electronically routed and multiplexed in a high-speed electrical signal that is generated by the router for a specific optical wavelength.

As the demand for bandwidth in optical networks continues to increase, the router must be able to perform its switching at higher rates. The electronic signal bandwidth limitations incurred during the O/E conversion and the conversion back to an optical signal (E/O conversion), however, often result in router congestion and reduced data throughput. In addition, the low energy optical pulses received at the router after propagation over long distances can be degraded, for example, by chromatic dispersion and nonlinear effects in the transmission fiber. The optical pulses can also exhibit timing variations (i.e., jitter) within a bit interval.

Conventional electronic signal regenerators provide pulse amplification, pulse shaping and timing jitter correction of an electrical signal. For WDM networks, an electronic signal regenerator is required for each wavelength channel. After the O/E conversion, the single wavelength channel electronic data is demultiplexed into lower-rate data streams and each stream is processed electronically. The lower-rate data streams are multiplexed into a single data stream that is used to modulate the desired wavelength optical carrier. The use of electronic regenerators for re-amplification, re-shaping and re-timing in high-speed optical networks is often prohibited by cost, complexity, and power in many-channel WDM networks and sometimes is limited by processing speed in ultrafast optical time domain multiplexing (OTDM) networks.

All-optical switches eliminate the need for the O/E conversion and E/O conversion. Consequently, all-optical switches generally support higher data rates than electronic switches. Optical switches utilizing nonlinearities in optical fibers are subject to polarization instability due to temperature variations and acoustic disturbances. Semiconductor materials are used as the nonlinear media in some optical switches, however, the operational speed of these switches is typically limited by multiple physical processes. For example, long-lasting refractive index nonlinearities cause performance degradations that are dependent on the data statistics and the data rate.

SUMMARY OF THE INVENTION

In brief overview, the present invention relates to an all-optical switch that is significantly insensitive to polarization instabilities in the switch and, consequently, does not require active polarization control. The optical switch can be configured as an ultrafast logic gate, a switch for ultrafast communication systems or a key component of an all-optical regenerator. Performance is independent of the statistical characteristics of the data controlling the switch.

In one aspect, the invention features an optical switch having a birefringent optical channel, a coupler, a nonlinear optical channel and a polarization rotation mirror. The birefringent optical channel has a first port and a second port, and provides a pair of orthogonally polarized optical pulses at the second port in response to a first optical pulse received at the first port. The orthogonally polarized optical pulses are separated by a delay time. In one embodiment, the birefringent optical channel is a polarization maintaining optical fiber. In another embodiment, the birefringent optical channel is a birefringent crystal. The coupler has a first port in optical communication with the second port of the birefringent optical channel, a second port adapted to receive a second optical pulse, and a third port. In one embodiment, the optical switch includes a control optical channel in optical communication with the second port of the coupler. The nonlinear optical channel has a first port in optical communication with the third port of the coupler. In one embodiment, the nonlinear optical channel is a dispersion shifted optical fiber. In another embodiment, the nonlinear optical channel is an optical semiconductor. The polarization rotation mirror is in optical communication with the second port of the nonlinear channel.

In another aspect, the invention features a method for regenerating an optical data pulse. The method includes transmitting the optical data pulse and a pair of orthogonally polarized optical pulses through a nonlinear optical channel in a forward direction. The optical data pulse and the orthogonally polarized optical pulses each have a forward polarization orientation with respect to the nonlinear optical channel. The orthogonally polarized optical pulses are separated in time, and the optical data pulse and one of the orthogonally polarized optical pulses are substantially temporally coincident. The method also includes transmitting the optical data pulse and the orthogonally polarized optical pulses through the nonlinear optical channel in a reverse direction wherein the optical data pulse and the orthogonally polarized optical pulses each have a reverse polarization orientation with respect to the nonlinear optical channel. Each of the reverse polarization orientations is orthogonal to a respective forward polarization orientation. An optical phase delay is imparted to one of the orthogonally polarized optical pulses relative to the other orthogonally polarized optical pulse in response to the coincident transmission of the optical data pulse and one of the orthogonally polarized optical pulses through the nonlinear optical channel. The method also includes the step of delaying one of the orthogonally polarized optical pulses relative to the other orthogonally polarized optical pulse to generate a temporal coincidence.

In another aspect, the invention features a method for performing a logical operation of a first optical data bit and a second optical data bit. The first and second optical data bits are separated by a predetermined time. The method includes transmitting the first and second optical data bits, a first optical clock bit and a second optical clock bit through a nonlinear optical channel in a forward direction. The first and second optical data bits and the first and second optical clock bits each have a forward polarization with respect to the nonlinear optical channel. In addition, the first and second optical clock bits are orthogonally polarized and separated in time. The first optical data bit is substantially temporally coincident with the first optical clock bit and the second optical data bit is substantially temporally coincident with the second optical data bit. The method also includes transmitting the optical data bits and the optical clock bits through the nonlinear optical channel in a reverse direction. The first and second optical data bits and the first and second optical clock bits each have a reverse polarization orientation with respect to the nonlinear optical channel. Each of the reverse polarization orientations is orthogonal to a respective forward polarization orientation. An optical phase delay is imparted to the first optical clock bit if the first optical data bit is in an asserted state and an optical phase delay is imparted to the second optical clock bit if the second optical data bit is in an asserted state. The method also includes delaying the first optical clock bit relative to the second optical clock bit to generate a temporal coincidence between the optical clock bits.

In another aspect, the invention features a method for performing a logical operation on a first optical data bit and a second optical data bit. The method includes generating a pair of orthogonally polarized optical bits separated in time in response to the first optical data bit. One of the orthogonally polarized optical bits is substantially temporally coincident with the second optical data bit. The method also includes transmitting the orthogonally polarized optical bits and the second optical data bit through a nonlinear optical channel in a forward direction wherein the orthogonally polarized optical bits and the second optical data bit each have a forward polarization with respect to the nonlinear optical channel. The orthogonally polarized optical bits and the second optical data bit are transmitted through the nonlinear optical channel in a reverse direction wherein the orthogonally polarized optical bits and the second optical data bit each have a reverse polarization orientation with respect to the nonlinear optical channel. Each of the reverse polarization orientations is orthogonal to its respective forward polarization orientation. An optical phase delay is imparted to the one of the orthogonally polarized optical bits in response to the coincident transmission of the one of the orthogonally polarized optical bits and the second optical bit. One of the orthogonally polarized optical bits is delayed relative to the other of the orthogonally polarized optical bits to generate a temporal coincidence between the orthogonally polarized bits.

In another embodiment of the method for performing a logical operation on a first optical data bit and a second optical data bit, the method includes transmitting the first and second optical data bits, a first optical clock bit and a second optical clock bit through a nonlinear optical channel in a forward direction wherein the first and second optical data bits and the first and second optical clock bits each have a forward polarization with respect to the nonlinear optical channel. The first and second optical clock bits are orthogonally polarized and separated by a first time. In addition, the first optical data bit and the second optical data bit are substantially temporally coincident with the first optical clock bit. The method also includes transmitting the optical data bits and the optical clock bits through the nonlinear optical channel in a reverse direction wherein the first and second optical data bits and the first and second optical clock bits each have a reverse polarization orientation with respect to the nonlinear optical channel. Each of the reverse polarization orientations is orthogonal to a respective forward polarization orientation. An optical phase delay is imparted to the first optical clock bit if the first optical data bit is in an asserted state, the second optical data bit is in an asserted state or the first optical clock bit and the second optical clock bits are in an asserted state. The method includes delaying the first optical clock bit relative to the second optical clock bit to generate a temporal coincidence between the optical clock bits.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
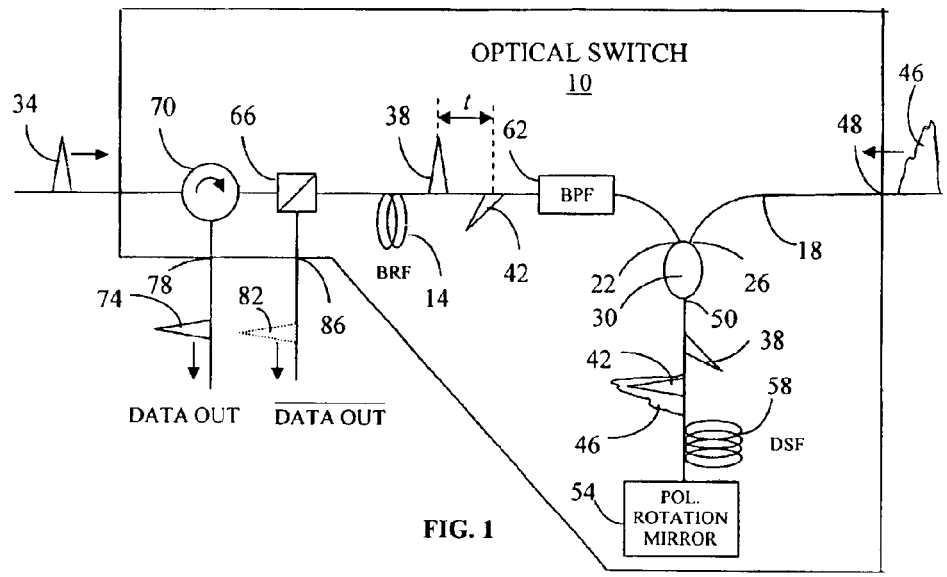
FIG. 1 is a diagram of an embodiment of an optical switch in accordance with the invention.

FIG. 1 illustrates an all-optical switch 10 constructed in accordance with the present invention. The switch 10 is configured as a folded ultrafast nonlinear interferometer (FUNI). The switch 10 is a component of an all-optical 3R regenerator that re-amplifies, re-shapes and re-times optical data pulses. Reshaping removes distortion in an optical data pulse caused, for example, by chromatic dispersion and nonlinear properties of the transmission path. Re-timing removes any timing jitter (i.e., variation in pulse position within a bit interval) present in an optical data pulse stream. Effectively, the regenerator recovers the clock of the data pulse stream and generates a stream of local clock pulses to match the data pulse clock. The all-optical switch 10 outputs a local transform-limited optical clock pulse if an optical data pulse is present in the corresponding bit interval of the data pulse stream. Conversely, no local optical clock pulse is output if the optical data pulse is absent from the bit interval. In effect, the switch 10 operates logically as an AND gate with the local optical clock pulses provided as a first input and the optical data pulses provided as a second input.

The switch 10 includes a birefringent optical channel 14 and a control optical channel 18 in optical communication with ports 22 and 26, respectively, of an optical coupler 30. In the illustrated embodiment, the birefringent optical channel 14 is a birefringent optical fiber (BRF) 14 such as a polarization maintaining optical fiber (PMF). The birefringent axes of the BRF 14 are oriented to the polarization of a local optical pulse 34 such that a corresponding pair of orthogonally polarized (OP) optical pulses 38, 42 separated by a delay time t, exits the BRF 14. In another embodiment (not shown), a highly birefringent crystal is used in place of the BRF 14. The birefringent axes of the crystal are similarly oriented with respect to the polarization of the local optical pulse 34 to provide the OP pulses 38, 42. Use of the birefringent crystal eliminates the need for the longer length of BRF 14 and, therefore, results in a smaller switch package. The control optical channel 18 is a single mode optical fiber coupled to, or part of, an optical communications link. Optical data pulses 46 received at the switch input port 48 are transmitted from the control optical channel 18 to the optical coupler 30. In one embodiment the optical coupler 30 is a wavelength division multiplexer (WDM) that achieves efficient coupling of different wavelength local and network optical signals received at coupler ports 22 and 26 into a combined optical signal at coupler port 50. In another embodiment the optical coupler 30 is a beamsplitter-type combiner (e.g., 3 dB combiner).

The switch 10 also includes a polarization rotation mirror 54 in optical communication with the coupler port 50 of the optical coupler 30 through a nonlinear optical channel 58. In the illustrated embodiment, the nonlinear optical channel 58 is a dispersion shifted optical fiber (DSF). As described below, the zero dispersion wavelength of the DSF 58 is selected to be approximately the average value of the wavelength of the local optical pulses 34 and the optical data pulses 46. In an alternative embodiment (not shown) the nonlinear optical channel 58 is an optical semiconductor (e.g., semiconductor optical amplifier Alcatel model no. A1901SOA or OptoSpeed model no. SOA1550MRI/X-250). The polarization rotation mirror 54 is a Faraday mirror (e.g., E-Tek model no. HSFM20A0S4010) or other optical component, or combination of components, that yields a reflected optical pulse having a polarization that is orthogonal to the polarization of the corresponding incident optical pulse. If the optical coupler 30 is not wavelength discriminating (i.e. a WDM coupler), the switch 10 includes a bandpass filter 62 (e.g., DiCon model no. TF-1565-0.8-FC-3.0-1 or JDS model no. TB1570) disposed between the BRF 14 and the data pulse port 22 of the optical coupler 30. The switch also includes a polarization dependent beamsplitter 66 (e.g., example JDS model no. PMCB2P0781000-001) in optical communication with the BRF 14, and a three port optical circulator 70 (e.g., JDS model no. CIRM23A231000-1) in optical communication with the beamsplitter 66 and switch output port 78.

In operation, the switch 10 receives the stream of local optical pulses 34 generated by a local optical clock source (not shown). The local pulses 34 are routed through the circulator 70 to the polarization dependent beamsplitter 66. Preferably the local clock pulse 34 polarization is aligned for maximum transmission through the beamsplitter 66 to the BRF 14. The birefringent axes of the BRF 14 are aligned to the local optical pulses 34 so that the differential propagation for orthogonally polarized components of each local pulse 34 results in a pair of orthogonally polarized (OP), equal-amplitude pulses 38, 42 exiting the birefringent channel 14. For example, if the local pulses 34 are linearly polarized, the birefringent axes of the BRF 14 are aligned at approximately 45° to the plane of polarization.

The exiting OP pulses 38, 42 are separated by a time delay t according to the product of the birefringence magnitude and the length of the BRF 14. Delay time t determines the temporal width of the desired switching window for the switch 10. The minimum allowable delay time t is determined by the width of the local optical pulses 34. The switching window describes the ability of the switch 10 to accommodate timing jitter in the data pulses 46 as described below. OP pulses 38, 42 are transmitted through bandpass filter 62 to port 22 of the optical coupler 30. Data pulses 46 are transmitted over the control channel 18 to the second port 26 of the optical coupler 30. Both the OP pulses 38, 42 and the data pulses 46 are provided at the output port 50 of the optical coupler 30.

The polarization of the data pulses 46 is oriented to match the polarization of one of the OP pulses 42. Because the data pulses 46 are at a different wavelength than the OP pulses 38, 42, the data pulses 46 propagate through the DSF 58 at a different speed than the OP pulses 38, 42. If a data pulse 46 is present during a bit interval, the data pulse 46 overlaps one of the OP pulses 38, 42 for a period of time during forward transmission to and reflected (i.e., reverse) transmission from the polarization rotation mirror 54. As a result of nonlinear cross-phase modulation during the period of temporal overlap, the commonly polarized OP pulse 42 is shifted in optical phase relative to its complementary OP pulse 38. Advantageously, any polarization instability due to thermal and acoustic effects that occur during forward propagation of the pulses 38, 42, 46 are reversed, or compensated, during reverse propagation because of the orthogonal polarization rotation induced by the polarization rotation mirror 54. This compensation is achieved if the polarization instability does not vary over the round trip propagation time through the DSF 58.

The spectral bandpass of the bandpass filter 62 is selected so that the OP pulses 38, 42 are transmitted but the optical data pulses 46 are rejected. Although all three optical pulses 38, 42, 46 are transmitted back through the optical coupler 30 to the bandpass filter 62, only the OP pulses 38, 42 are transmitted to the BRF 14. In other embodiments other types of spectral filters are used in place of the bandpass filter 62. For example, a short wavelength-pass spectral cutoff filter can be used if the wavelength of the OP pulses 38, 42 is less than the wavelength of the data pulses 46. Conversely, a long wavelength-pass spectral filter can be used if the wavelength of the OP pulses 38, 42 is greater than the wavelength of the data pulses.

The OP pulses 38, 42 continue in reverse propagation through the BRF 14. Because the polarizations of the OP pulses 38, 42 during reverse propagation are orthogonal with respect to the original polarization during forward propagation, the delay time t induced during reverse propagation through the BRF 14 is opposite that induced on forward transmission. In other words, the slower OP pulse 38 during forward propagation through the BRF is the faster pulse during reverse propagation through the BRF 14. Consequently, returned OP pulses 38, 42 at the polarization dependent beamsplitter 66 are temporally coincident. Effectively, a single pulse substantially identical to the original local optical pulse 34 with an additional nonlinear phase shift and rotated polarization propagates from the BRF 14 to the beamsplitter 66.

If the relative optical phase delay between the coincident OP pulses 38, 42 is approximately zero, each pair of coincident OP pulses 38, 42 combines at the polarization dependent beamsplitter 66 to generate a single complementary output pulse 82 having a linear polarization oriented for reflection out of the beamsplitter 66. The complementary output pulse 82 is routed directly by the beamsplitter 66 to the switch complementary output port 86. Conversely, if the optical phase delay is such that the coincident pulses 38, 42 are out of phase (i.e., 180° relative phase difference), the coincident OP pulses 38, 42 combine at the polarization dependent beamsplitter 66 to generate a single output pulse 74 having a linear polarization oriented for transmission through the beamsplitter 66. The output pulse 74 is routed by the circulator 70 to the switch output port 78.

The FUNI configured optical switch 10 uses a DSF as its nonlinear medium rather than a BRF. If a BRF were used instead, its high birefringence would cause a single data pulse 46 to pass through multiple OP pulses 38, 42. This "walk-through" results in a symmetric phase shift in the OP pulses 38, 42 that is dependent on the number of data pulses 46 encountered. Consequently, the switching contrast is significantly influenced by network data statistics because a differential phase shift between OP pulses 38, 42 is required for switching. The use of low-birefringence DSF for the nonlinear optical channel 58, however, limits single data pulse 46 walk-through to a single OP pulse 42. The wavelength separation can be large as long as the difference in propagation speeds is small. This goal is accomplished by establishing the two wavelengths symmetrically (approximately) about the dispersion zero. The difference in propagation speeds of the OP pulses 38, 42 and the data pulses 46 determines the degree of walk-through in the nonlinear optical channel 58. A greater difference in propagation speeds permits the switch 10 to operate over a larger timing variation range between the data pulse 46 and its corresponding local pulse 42. The performance of the switch 10 as a function of time variation between data pulses 46 and local pulses 42 is referred to as the "switching window". A large switching window is required for a 3R regenerator to accommodate a large timing jitter range.

Figure 2:
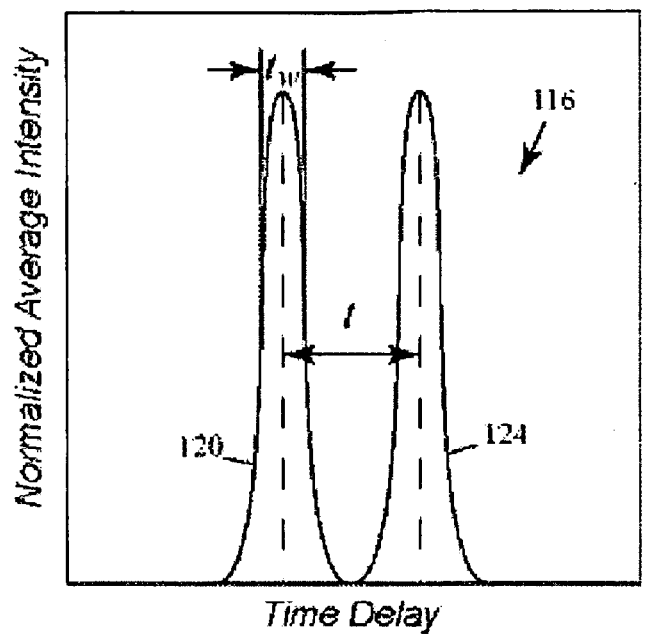
FIG. 2 is a plot of the normalized output intensity as a function of delay between a data pulse and the local clock pulse for the optical switch of FIG. 1.

FIG. 2 is a plot 116 of the normalized intensity of the switch output pulses 74 as a function of temporal delay between the data pulse 46 and the optical phase modulated OP pulses 38, 42 of the FUNI configured optical switch 10 of FIG. 1. The horizontal axis represents the delay between the data pulse 46 and one of the OP pulses 38, 42 and the vertical axis represents the normalized average intensity of the switch output pulse 74. Each peak 120, 124 corresponds to the coincidence of the data pulse 46 and one of the corresponding OP pulses 38, 42. The temporal width $t_W$ of each peak 120, 124 is determined by the differential group velocity between the data pulse 46 and the OP pulses 38, 42 in the DSF 58. The temporal separation t of the two peaks 120, 124 is determined by the temporal separation between the OP pulses 38, 42.

Figure 3:
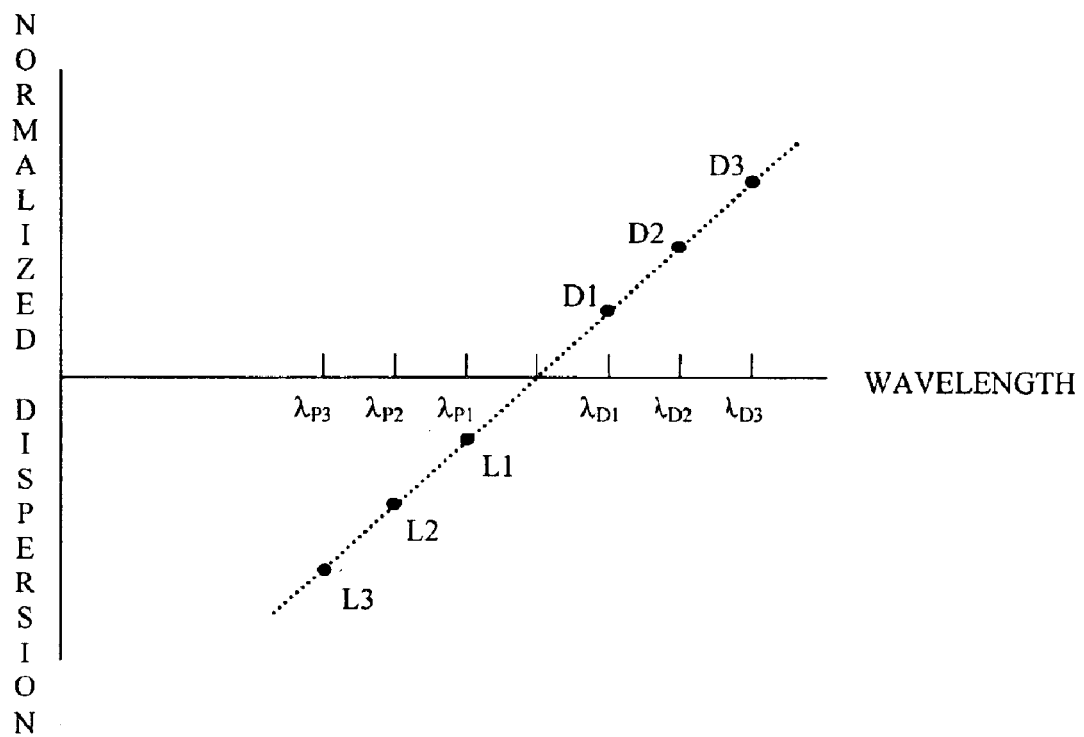
FIG. 3 is a plot of the normalized dispersion in the nonlinear medium as a function of wavelength for multiple-wavelength data channels and multiple-wavelength local clock channels for the optical switch of FIG. 1.

In one embodiment, the optical switch 10 of FIG. 1 is configured to operate in a WDM network in which a wavelength multiplexed data pulse stream is provided at input port 48. Referring also to FIG. 3, the normalized dispersion of the nonlinear optical channel 58 is plotted for each data pulse stream, designated D1, D2 and D3 (generally D), and its respective local pulse stream, L1, L2 and L3 (generally L), respectively. Although only three data pulse streams D and three local pulse streams L are plotted for clarity, it should be recognized that the number of data streams D and pulse streams L can be significantly greater. The number of data streams D that can be accommodated by the switch 10 without significant performance degradation is ultimately limited as described below.

The amount of pulse walk-through is determined according to the differential dispersion of the nonlinear optical channel 58 between the wavelengths of the pulse streams D and L. The D and L wavelength pairs are chosen to provide a small differential group delay such that a small (e.g., few picoseconds) temporal walk-through is achieved and the two pulse trains are tightly coupled. However, the propagation speeds of data pulse D1 and local pulse L1 are greater than the propagation speeds of data pulse D3 and local pulse L3. Consequently, data pulse D1 and local pulse L1 walk-through multiple data pulses D3 and local pulses L3. As the difference in wavelength range between the first and third D and L pulse streams increases, undesirable cross-phase modulation between distinct D and L pulse streams can impart a sufficient relative phase and the contrast of the output pulse stream 34 begins to degrade.

Figure 4:
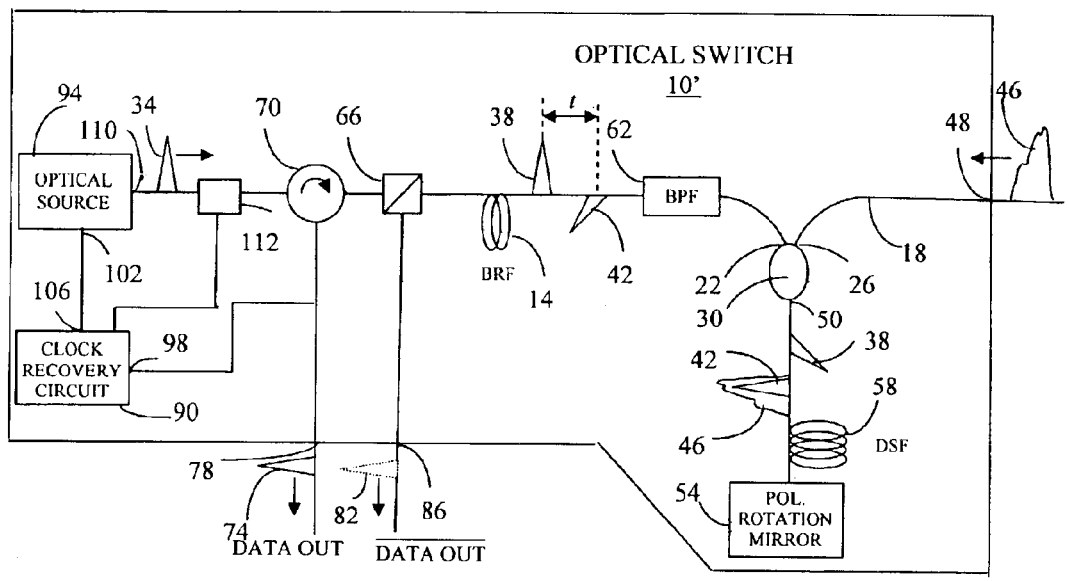
FIG. 4 is a diagram of another embodiment of an optical switch including a local optical clock source and a clock recovery circuit in accordance with the invention.

FIG. 4 shows an embodiment of an all-optical switch 10' constructed in accordance with the present invention. The switch 10' includes the components of the optical switch 10 of FIG. 1. In addition, a clock recovery circuit 90 and an optical source 94 enable the switch 10' to maintain, or recover, the clock for the optical data pulses 46. The clock recovery circuit 90 has an input port 98 in optical communication with the output port 78 of the optical switch 10'. The optical source 94 includes a control terminal 102 in communication with an output terminal 106 of the clock recovery circuit 90 and a source output port 110 in optical communication with the optical circulator 70 through an optical time delay module 112. In an alternative embodiment (not shown) the input port 98 of the clock recovery circuit 90 is in optical communication with the complementary output port 86 of the optical switch 10'. In another alternative embodiment (not shown) the input port 98 of the clock recovery circuit 90 is in optical communication with the control input 48 in order to recover the clock directly from the network data stream.

If the clock recovery circuit 90 is omitted from the switch 10', the local pulse stream 34 from the optical source 94 typically does not remain synchronized to the data pulse stream 46. The clock recovery circuit 90 serves to "lock" the pulse rate of the local pulse stream 34 to the pulse rate of the data pulse stream 46. In operation, the clock recovery circuit 90 provides a control signal at its output terminal 106 that is responsive to a timing phase shift between the local optical clock pulses 34 and the optical data pulses 46. In one embodiment the clock recovery circuit 90 includes a phase lock loop (PLL) circuit (e.g., second-order dithering PLL) and a RF driver circuit, and the optical source 94 includes a mode-locked fiber laser (e.g., mode-locked soliton source). The PLL circuit modulates the RF source to generate a control signal at the output terminal 106 of the clock recovery circuit 90. In response, the pulse rate of the mode-locked laser is changed to "track" the pulse rate of the optical data pulses 46.

The time delay module 112 delays the local optical pulses 34 in response to a delay signal generated by the clock recovery circuit 90. This delay may be required if, for example, one or more optical path lengths in the switch 10' change in time due to temperature variations in the optical components which can cause an undesirable timing shift between the local pulses and data pulses 34, 46. The time delay module 112 can be, for example, a piezoelectric "stretcher" integrated with an optical fiber that couples the local optical pulses 34 generated by the optical source 94 to the circulator 70. In an alternative configuration (not shown) the time delay module 112 is in electrical communication with the clock recovery circuit 90 and in optical communication with port 26 of the WDM 30 and the switch input port 48. In this alternative configuration the time delay module 112 delays the data pulse 46 in response to the delay signal generated by the clock recovery circuit 90.

Figure 5:
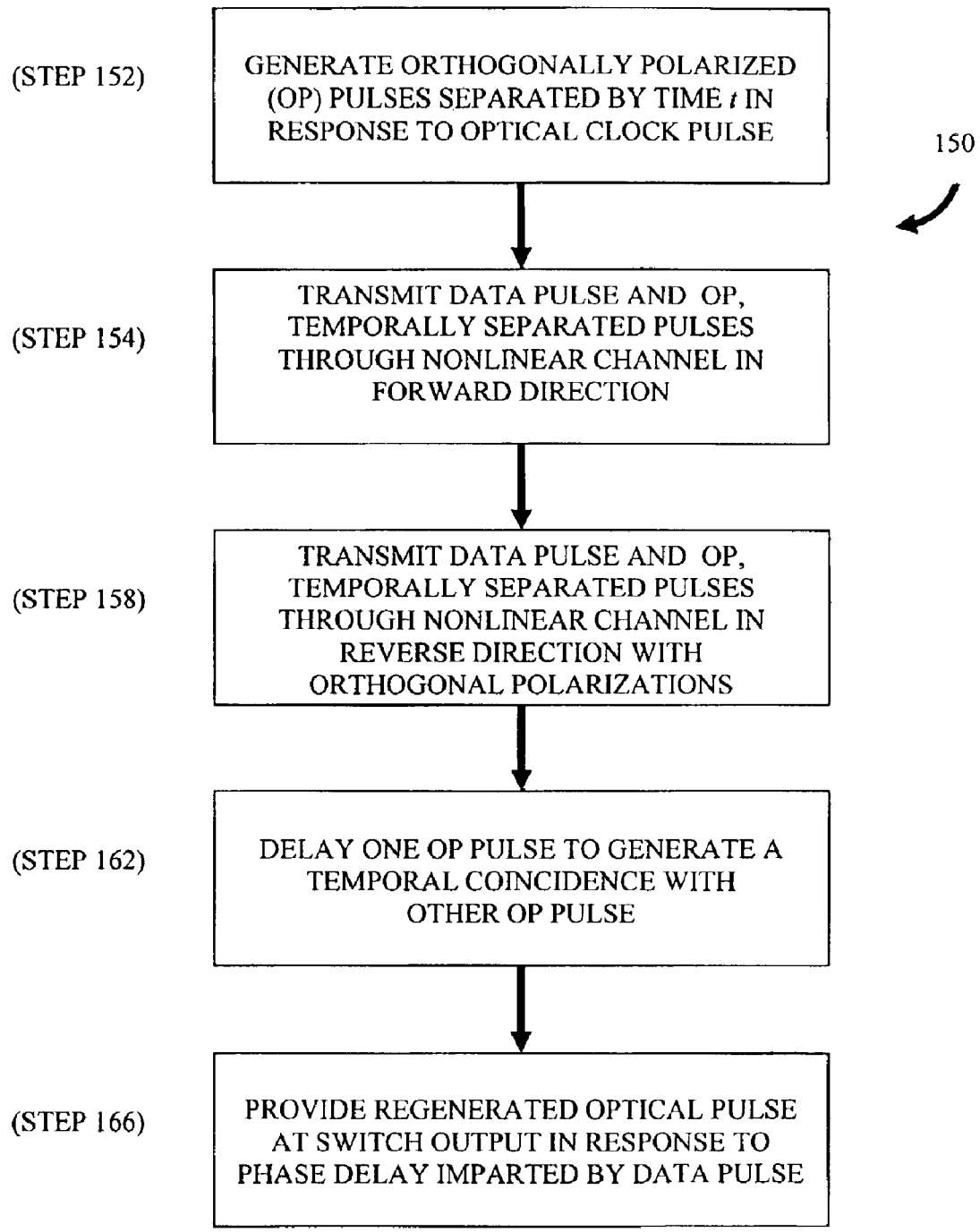
FIG. 5 is a flowchart representation of an embodiment of a method for regenerating an optical data pulse in accordance with the invention.

FIG. 5 shows an embodiment of a method 150 for regenerating an optical data pulse 46 using the optical switch 10 of FIG. 1. A pair of OP pulses separated by a time t are generated (step 152) in response to an optical clock pulse. The optical data pulse 46 and the pair of OP optical pulses 38, 42 are transmitted (step 154) through the nonlinear optical channel 58 in a forward direction. The optical data pulse 46 is substantially temporally coincident with one of the OP pulses 38, 42 such that the two optical pulses (e.g. 42, 46) overlap for at least a portion of the forward transmission and/or subsequent reverse transmission. In one embodiment the wavelength of the data pulse 46 is different from the wavelength of the OP pulses 38, 42. The three pulses 38, 42, 46 are transmitted (step 158) through the nonlinear optical channel 58 in a reverse direction after an orthogonal rotation of their polarization components. Polarization rotation is achieved by the polarization rotation mirror 54 (e.g., reflective Faraday rotator). An optical phase delay is imparted to one of the OP pulses 42 as a result of the walk-through with the data pulse 46 in the nonlinear optical channel 58. In one embodiment the optical phase delay is an odd integer multiple of 180°.

In step 162 one of the OP pulses 42 is delayed by a time t relative to the other pulse 38 to "undo" or remove the original delay t so that the pair of pulses 38, 42 are temporally coincident. The delay t is imparted during reverse propagation through the birefringent optical channel 14. A regenerated optical pulse 74 is provided (step 166) at the switch output port 78 in response to the imparted optical phase delay. In effect, the regenerated output pulse 74 is the combination of the two OP optical pulses 38, 42 into a single pulse having the proper polarization orientation so that the polarization dependent beamsplitter 66 routes the combined pulses 38, 42 to the output port 78.

Figure 6:
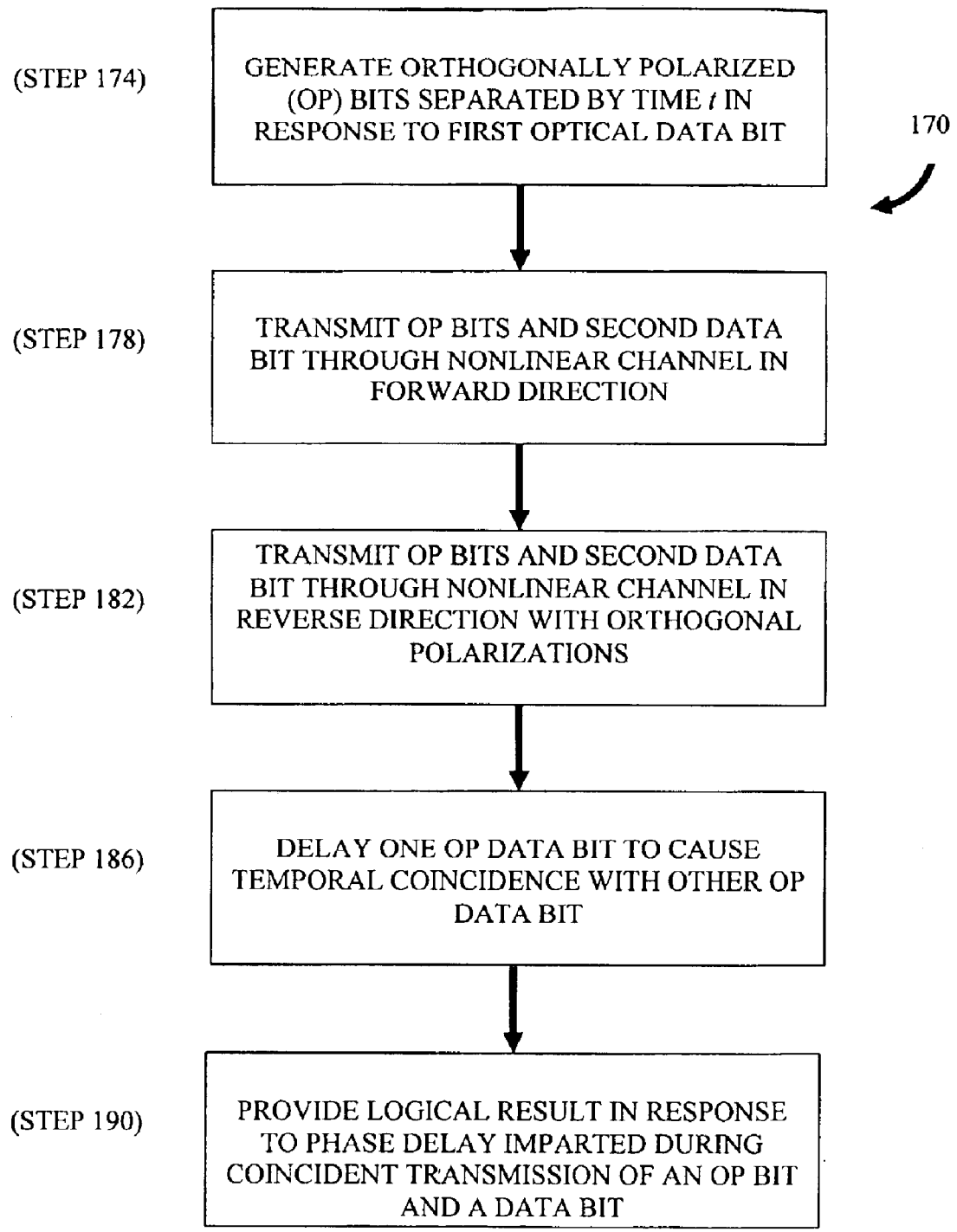
FIG. 6 is a flowchart representation of an embodiment of a method for performing a logical operation on a first optical data bit and a second optical data bit in accordance with the invention.

FIG. 6 shows an embodiment of a method 170 for performing a logical operation on a first optical data bit and a second optical data bit according to the optical switch of FIG. 1. It is to be understood that the term "optical bit" as used herein refers to an optical logic event and is generally interchangeable with the term "optical pulse". Method 170 includes generating (step 174) a pair of OP optical bits (pulses 38 and 42) in response to the first optical data bit. The OP optical bits 38, 42 are separated by a time t. One of the OP optical bits 42 is substantially temporally coincident with the second optical data bit 46. The OP optical bits 38, 42 and the second optical data bit 46 are transmitted (step 178) through the nonlinear optical channel 58 in a forward direction. The OP optical bits 38, 42 and the second optical bit 46 are then transmitted (step 182) through the nonlinear optical channel 58 in a reverse direction. The polarizations of the optical bits 38, 42, 46 during reverse transmission are orthogonal to the respective polarization of the forward propagating optical bits due to the polarization rotation mirror 54.

As previously described, the second optical data bit 46 and OP optical bit 42 overlap for at least a portion of the forward transmission and reverse transmission through the nonlinear optical channel 58. An optical phase delay is imparted to the overlapped OP optical bit 42 during the pulse walk-through. In one embodiment this phase delay is an odd integer multiple of 180°. After reverse transmission is complete, one of the OP data bits 42 is delayed (step 186) relative to the other OP data bit 38 to generate a temporal coincidence. In step 190, a result of the logical operation is provided at switch output port 78 in response to the phase delay imparted to the overlapped OP optical bit 42 relative to the other OP optical bit 38. In one embodiment the logical operation is an AND operation. Thus, an output bit (pulse 74) is present at the switch output port 78 only if both the first optical bit 34 and the second optical bit 46 are present. In another embodiment the logical operation is a Boolean AND operation between the signal input 110 and the inverse of the control channel 48. This operation is obtained by taking the complementary output 86 as the switch output.

Figure 7:
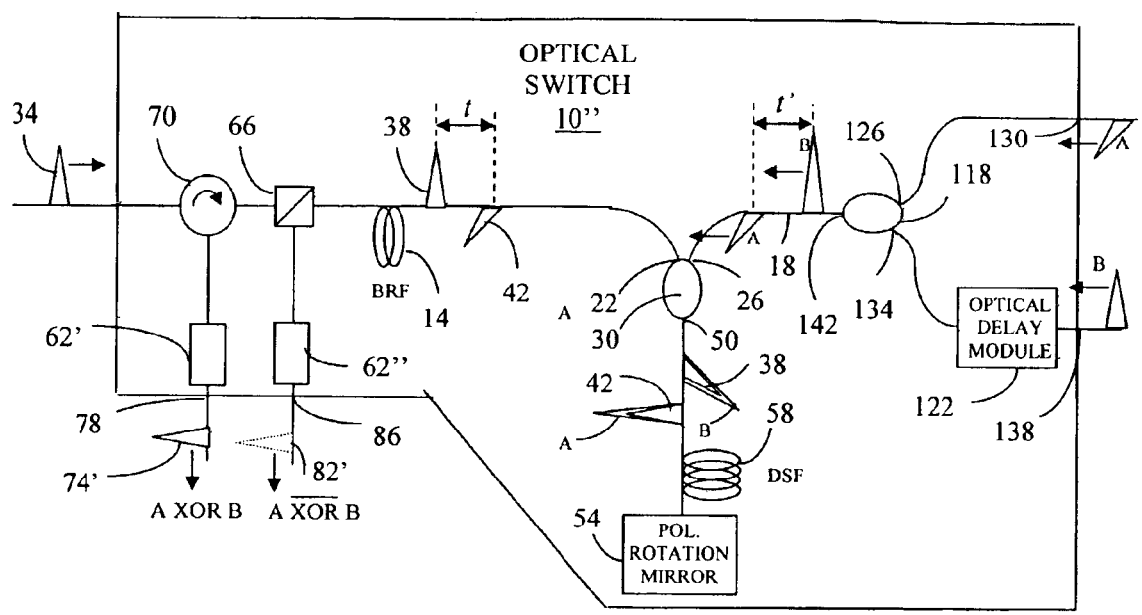
FIG. 7 is a diagram of another embodiment of an optical switch in accordance with the invention.

FIG. 7 depicts an all-optical switch 10" configured to operate as an ultrafast Boolean exclusive-OR (XOR) logic gate according to the present invention. All the components of the all-optical switch 10 depicted in FIG. 1 are present in the same configuration except that the bandpass filter 62' is disposed between the circulator 70 and the output port 78 and a second bandpass filter 62" is disposed between the beamsplitter 66 and the complementary output port 86. The XOR gate 10" also includes a second optical coupler 118 and an optical delay module 122. The coupler 118 has a first coupler port 126 in optical communication with a first gate input port 130 and a second coupler port 134 in optical communication with the optical delay module 122. The optical delay module 122 is also in communication with a second gate input port 138.

In operation, the logic gate 10" performs the logical XOR operation on logical optical input bit A and optical input bit B (i.e., A XOR B) as summarized in Table 1. The optical delay module 122 delays optical bit B relative to optical bit A by a time t' approximately equal to the delay time t between the OP pulses 38, 42. To achieve XOR functionality with logic gate 10", the optical input bits A and B are either co-polarized with the OP pulses 38, 42 (i.e. same polarizations) or orthogonally aligned to the OP pulse 38, 42 polarizations. The combination of optical bit stream A and optical bit stream B is provided at the output port 142 of the coupler 118. Combined optical bit stream A and B is combined by the coupler 30 with the OP pulse stream 38, 42.

TABLE 1

| Gate Input Port 130 A | Gate Input Port 138 B | Complementary Gate Output Port 86 A $\overline{\text{XOR}}$ B | Gate Output Port 78 A XOR B |
|---|---|---|---|
| 0 | 0 | 1 | 0 |
| 0 | 1 | 0 | 1 |
| 1 | 0 | 0 | 1 |
| 1 | 1 | 1 | 0 |

If both optical bit A and optical bit B are provided during the same bit interval at the gate input ports 130 and 138, respectively, optical bit A overlaps (or walks through) one OP pulse 42 and optical bit B overlaps (or walks through) the other OP pulse 38 during forward and reverse propagation through the nonlinear optical channel 58. Thus, an optical phase shift is induce by cross-phase modulation in each of the OP pulses 38, 42. There is no change, however, to the relative optical phase between the OP pulses 38, 42. Consequently, polarization rotation at the polarization rotation mirror 54 and reverse propagation through the birefringent optical channel 14 yields a single output pulse 82' having a polarization orientation that is substantially orthogonal to the orientation defined by the sum of the polarization vectors of the OP pulses 38, 42. Consequently, the output pulse 82' is reflected out of the polarization dependent beamsplitter 66 and routed through the bandpass filter 62" to the complementary switch output port 86 indicating $\overline{A\,XOR\,B}=1$.

If both data optical bits A and B are absent, there is no optical phase shift imparted to either OP pulse 38, 42. Again, there is no change to the relative optical phase between the optical pulses 38, 42 and a single output pulse 82' is provided to the switch complementary output port 86 indicating $\overline{A\,XOR\,B}=1$.

If only one of the optical data bits A and B is present in the bit interval, the corresponding overlapped OP pulse 38 or 42 acquires an optical phase shift during propagation through the nonlinear optical channel 58. As a result, the relative optical phase between the OP pulses 38, 42 is changed. The relative optical phase change that is proportional to the product of the data bit A or B intensity and the DSF 58 length and nonlinear index of refraction is selected to be 180°. After polarization rotation occurs at the polarization rotation mirror 54, reverse propagation of the OP pulses 38, 42 through the birefringent optical channel 14 yields a single complementary output pulse 74' having a polarization orientation that is substantially identical to the polarization orientation defined by the sum of the polarization vectors of the OP pulses 38, 42. Consequently, no output pulse 82' is available at the switch output port 86. Instead, the complementary output pulse 74' is directed by the circulator 70 through bandpass filter 62' to the switch output port 78 indicating $\overline{A\,XOR\,B}=1$.

In contrast to the optical switch 10 of FIG. 1, the OP optical pulses 38, 42 (combined as a logic output pulse 74' or 82', respectively) pass through a bandpass filter 62' or 62" only once. Accordingly, the optical loss imparted to the OP optical pulses 38, 42 for the XOR logic gate 10" are less. The two bandpass filters 62', 62" can be replaced by the single bandpass filter 62 positioned as depicted in FIG. 1 if the additional optical loss is acceptable.

Figure 8:
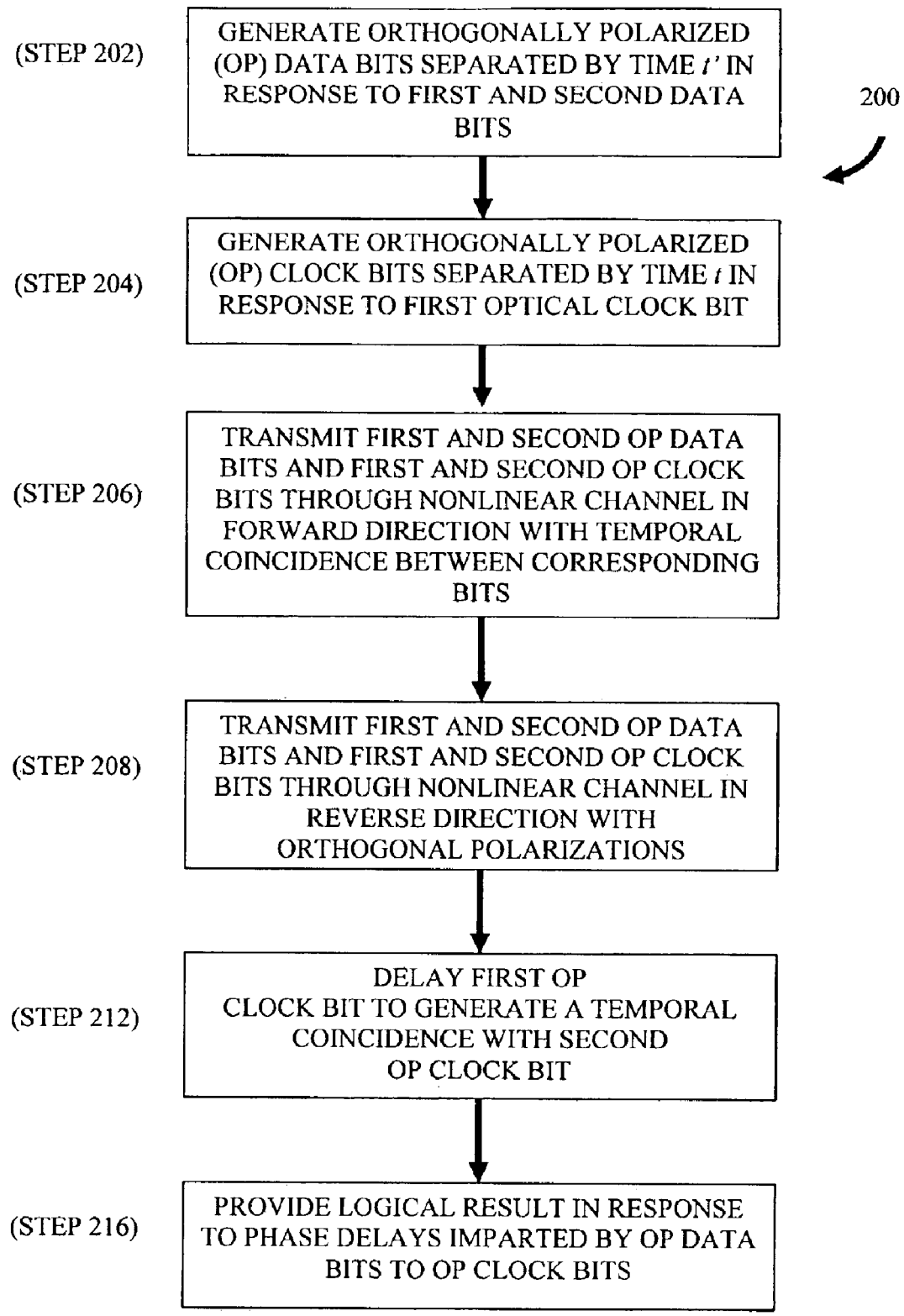
FIG. 8 is a flowchart representation of another embodiment of a method for performing a logical operation on a first optical data bit and a second optical data bit in accordance with the invention.

FIG. 8 shows an embodiment of a method 200 for performing a logical operation on a first optical data bit and a second optical data bit separated by a predetermined time t using the optical switch of FIG. 7. Method 200 includes generating (step 202) a first OP data bit A and a second OP data bit B separated by a time t' in response to a pair of received optical data bits. A first OP clock bit and a second OP clock bit (optical pulses 42 and 38, respectively) separated by a time t are generated (step 204) in response to an optical clock bit. The first and second OP data bits A, B, and the first and second OP clock bits are transmitted (step 206) through the nonlinear optical channel 58 in a forward direction. The first OP data bit A is substantially temporally coincident with the first OP clock bit 42 such that the two bits A, 42 overlap during at least a portion of the forward transmission or subsequent reverse transmission through the nonlinear optical channel 58. Similarly, the second OP data bit B is substantially temporally coincident with the second OP clock bit 38.

The method 200 also includes transmitting (step 208) the first and second OP data bits A, B and the first and second OP clock bits 42, 38 through the nonlinear optical channel 58 in a reverse direction. Because of the presence of the polarization rotation mirror 54, the polarizations of each of the OP data bits A, B and the OP clock bits 38, 42 are orthogonal to their respective polarizations during transmission in the forward direction through the nonlinear optical channel 58. An optical phase delay is imparted to the first OP clock bit 42 if the first OP data bit A is in an asserted state (i.e., the optical pulse 46 is present for the corresponding bit interval). Similarly, an optical phase delay is imparted to the second OP clock bit 38 if the second OP data bit B is in an asserted state. In one embodiment the phase delay imparted to either or both OP clock bits 38, 42 is approximately an odd integer multiple of 180°. The first OP clock bit 42 is delayed (step 212) relative to the second OP clock bit 38 so that the bits 38, 42 are temporally coincident.

The result of the logical operation is provided (step 216) in response to the optical phase delays imparted to the first and second OP clock bits 42, 38. In one embodiment the logical operation is an XOR operation and the result is represented by optical pulse 74' described above. In another embodiment the logical operation is a complementary XOR operation and is represented by optical pulse 82' described above.

Figure 9:
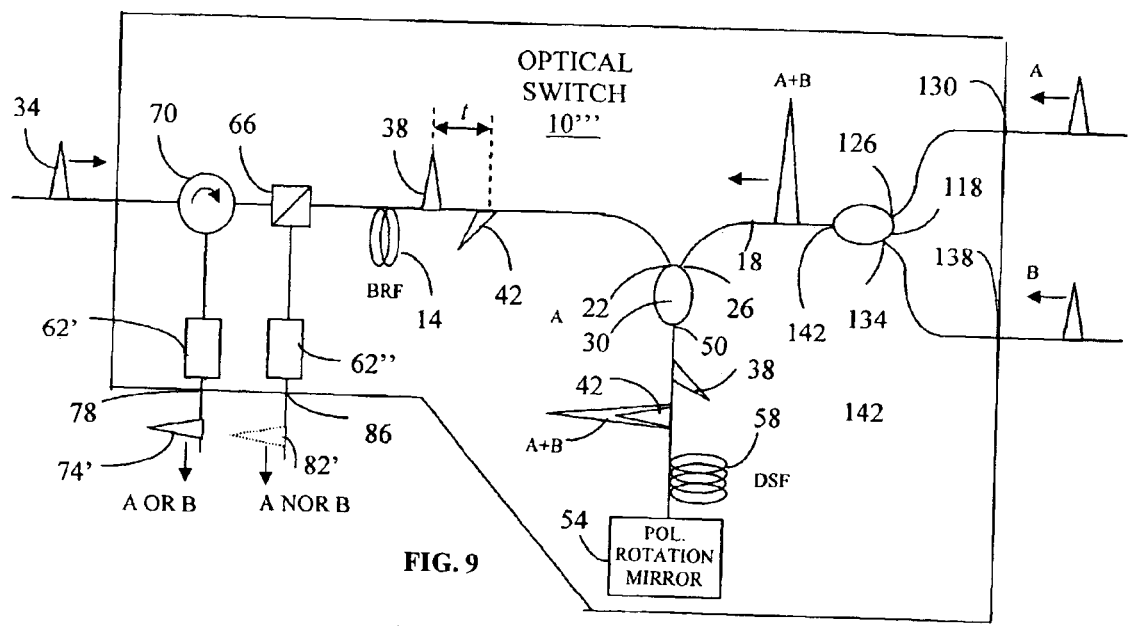
FIG. 9 is a diagram of another embodiment of an optical switch in accordance with the invention.

FIG. 9 depicts an all-optical switch 10''' configured to operate as a Boolean OR logic gate according to the present invention. The components of the all-optical switch 10" depicted in FIG. 7 are present in the same configuration except that the optical delay module 122 is absent.

In operation, the all-optical switch 10''' performs the logical OR operation on logical optical bit A and optical bit B (i.e., A OR B) as summarized in Table 2.

TABLE 2

| Gate Input Port 130 A | Gate Input Port 138 B | Complementary Gate Output Port 86 A NOR B | Gate Output Port 78 A OR B |
|---|---|---|---|
| 0 | 0 | 1 | 0 |
| 0 | 1 | 0 | 1 |
| 1 | 0 | 0 | 1 |
| 1 | 1 | 0 | 1 |

If both optical bit A and optical bit B are provided during the same bit interval at the gate input ports 130 and 138, respectively, the resulting higher amplitude optical pulse A+B shown at the output port 142 of the logic coupler 118 is present. However, the optical powers of the optical data bits A and B are selected so that the switch 10''' operates in saturation. One embodiment of this switch 10''' can be realized if the DSF nonlinear optical channel 58 is replaced with a semiconductor optical amplifier. In such an embodiment, the magnitude of the optical phase shift imparted to the overlapped OP pulse either 38 or 42 during transmission through the nonlinear optical channel 58 is the same regardless of whether one or both optical bits A and B are present. Thus, the presence of at least one optical bit A, B during the bit interval is sufficient to provide an output pulse 74' at the switch output port 78 indicating A OR B=1 (or A NOR B=0). If optical bit A and optical bit B are both absent during the bit interval, an output pulse 82' is provided at the complementary switch output port 86 indicating A OR B=0 (or A NOR B=1).

Figure 10:
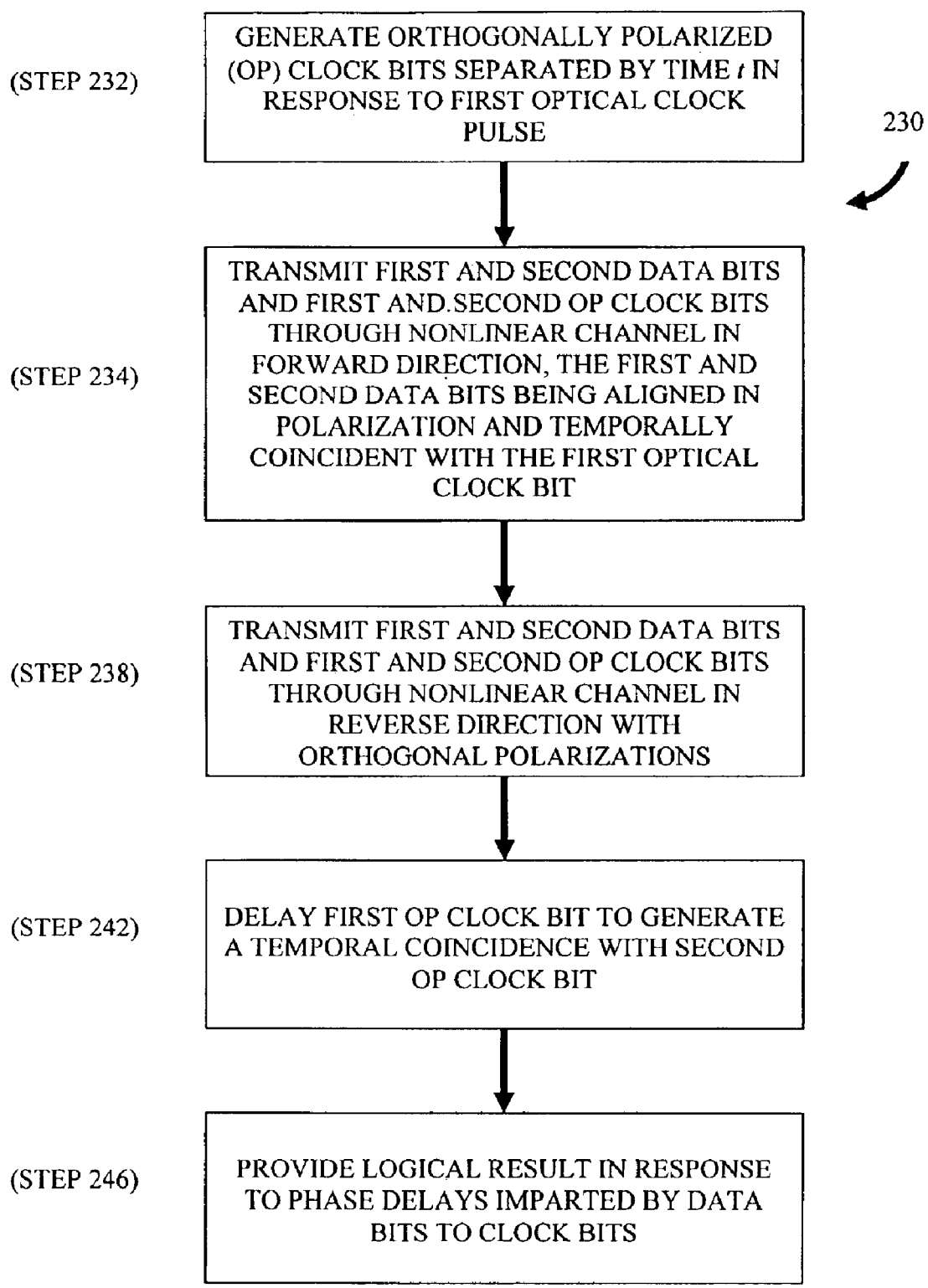
FIG. 10 is a flowchart representation of another embodiment of a method for performing a logical operation on a first optical data bit and a second optical data bit in accordance with the invention.

FIG. 10 shows an embodiment of a method 230 for performing a logical operation on a first optical data bit and a second optical data bit with reference to the optical switch

10''' of FIG. 9. The method 230 includes generating (step 232) a first and a second OP clock bits 42 and 38, respectively, in response to a received optical clock pulse 34. The first and second optical data bits A and B, respectively, and the first and second OP clock bits 42, 38 are transmitted (step 234) through the nonlinear optical channel 58 in a forward direction. The optical data bits A, B and the OP clock bits 38, 42 are then transmitted (step 238) in a reverse direction through the nonlinear optical channel 58 in a reverse direction. The polarizations of each of the optical data bits A, B and the OP clock bits 38, 42 are rotated by the polarization rotation mirror 54 such that they are orthogonal to their respective polarizations during transmission in the forward direction through the nonlinear optical channel 58. Because of the temporal coincidence of optical bits A and B, and the first OP clock bit 42, an optical phase delay is imparted to the first OP clock bit 42 if either optical data bit A or B is in an asserted state. In one embodiment, the phase delay imparted to either or both OP clock bits 38, 42 is approximately an odd integer multiple of 180°. The first OP clock bit 42 is delayed (step 242) relative to the second OP clock bit 38 so that the OP clock bits 38, 42 are temporally coincident. In step 246 the result of the logical operation is provided at switch port 78 (or switch port 86) in response to the optical phase delay imparted to the first OP clock bit 42. In one embodiment the logical operation is an OR operation and is represented by optical pulse 74' as described above. In another embodiment the logical operation is a NOR operation and is represented by optical pulse 82' as described above.

Figure 11:
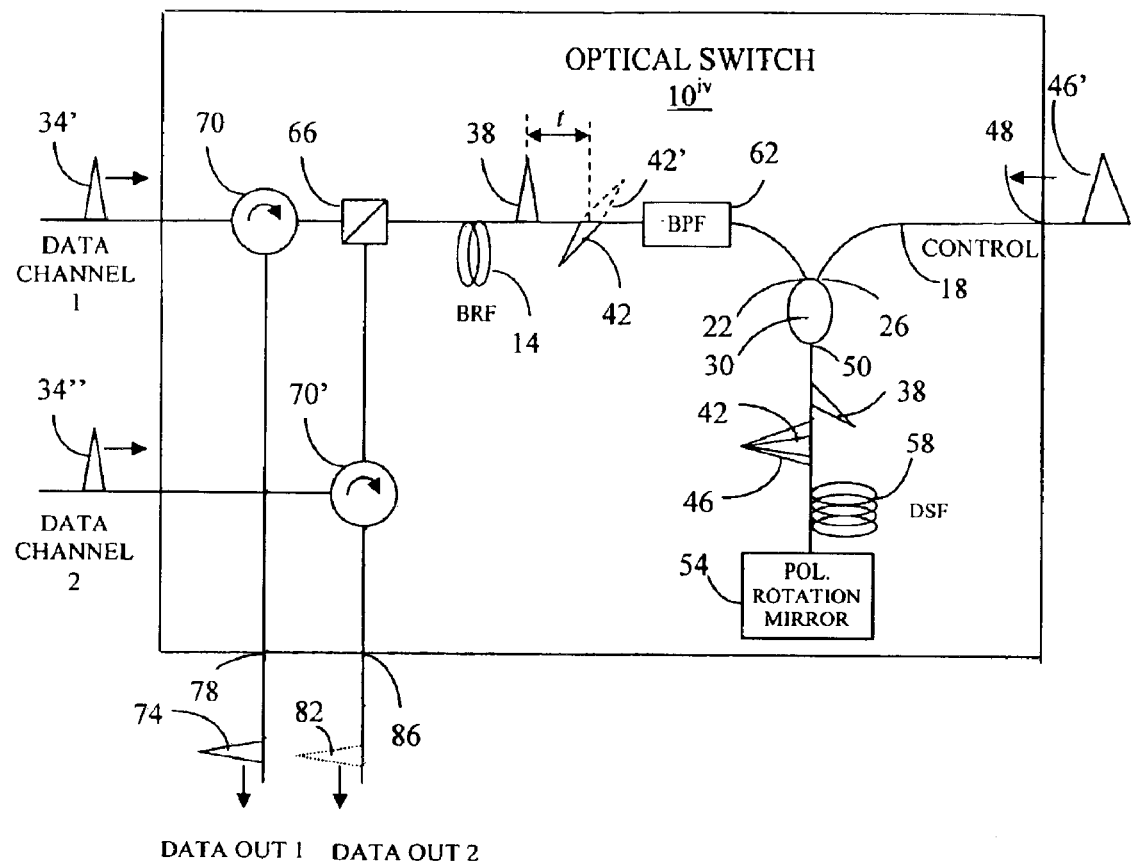
FIG. 11 is a diagram of another embodiment of an optical switch in accordance with the invention.

Many other variations of the all-optical switch 10 of the present invention are possible using the principles described above. For example, FIG. 11 depicts an embodiment of an all-optical switch 10$^{iv}$ configured to operate as a 2×2 optical switch according to the present invention. The components of the switch 10 depicted in FIG. 1 are present in the same configuration except that an additional circulator 70' is included. The additional circulator 70' is in optical communication with the polarization dependent beamsplitter 66 and the complementary switch output port 86. Data channels 1 and 2 provide optical pulses 34' and 34", respectively, having orthogonal polarization orientations. If control pulse 46' is present during a bit interval, the channel 1 optical pulse 34' is routed to the switch output port 78 and the channel 2 optical pulse 34" is routed to the complementary switch output port 86. Conversely, if control pulse 46' is absent during the bit interval, the channel 2 optical pulse 34" is routed to the switch output port 78 and the channel 1 optical pulse 34' is routed to the complementary switch output port 86.

The optical switch of the present invention is not limited to the embodiments described above. Those of ordinary skill in the art will recognize that the optical switch can be configured to perform other logical and processing functions. For example, many data streams can be switched to any number of output ports according to the principles described above. In addition, optical switches can be cascaded or otherwise arranged to provide more complex processing of optical data streams.

While the invention has been shown and described with reference to specific preferred embodiments, it should be understood by those skilled in the art that various changes in form and detail may be made therein without departing from the spirit and scope of the invention as defined by the following claims.

What is claimed is:

1. An optical switch comprising:
    a birefringent optical channel having a first port and a second port, the birefringent optical channel providing a pair of orthogonally polarized optical pulses at the second port in response to a first optical pulse received at the first port, the orthogonally polarized optical pulses being separated by a delay time;
    a first coupler having a first port in optical communication with the second port of the birefringent optical channel, a second port adapted to receive a second optical pulse, and a third port;
    a control optical channel in optical communication with the second port of the first coupler;
    a nonlinear optical channel having a first port in optical communication with the third port of the first coupler, and having a second port; and
    a polarization rotation mirror in optical communication with the second port of the nonlinear channel.

2. The optical switch of claim 1 wherein the polarization rotation mirror is a Faraday mirror.

3. The optical switch of claim 1 wherein the polarization rotation mirror provides a reflected optical pulse in response to an incident optical pulse, the reflected optical pulse having a polarization that is rotated to be orthogonal with respect to the incident optical pulse.

4. The optical switch of claim 1 wherein the nonlinear optical channel comprises an optical fiber.

5. The optical switch of claim 1 wherein the nonlinear optical channel comprises a dispersion shifted optical fiber.

6. The optical switch of claim 1 wherein the nonlinear optical channel comprises an optical semiconductor.

7. The optical switch or claim 1 wherein the first coupler comprises a wavelength division multiplexer.

8. The optical switch of claim 1 wherein the birefringent optical channel comprises a polarization maintaining optical fiber.

9. The optical switch of claim 1 wherein the birefringent optical channel comprises a birefringent crystal.

10. The optical switch of claim 1 further comprising a circulator having a first port adapted to receive the first optical pulse, a second port in optical communication with the first port of the birefringent optical channel and a third port to provide a first output optical pulse.

11. The optical switch of claim 10 further comprising:
    an optical source having a control terminal and having a source output port in optical communication with the first port of the circulator, the optical source configured to generate the first optical pulse at the source output port in response to a control signal received at the control terminal; and
    a clock recovery circuit having an input port in optical communication with the third part of the circulator and an output terminal in communication with the control terminal of the optical source.

12. The optical switch of claim 11 further comprising a time delay module in electrical communication with the clock recovery circuit and in optical communication with the second port of the first coupler, the time delay module delaying the second optical pulse in response to a delay signal generated by the clock recovery circuit.

13. The optical switch of claim 11 further comprising a time delay module in electrical communication with the clock recovery circuit and in optical communication with the first port of the circulator, the time delay module delaying the first optical pulse in response to a delay signal generated by the clock recovery circuit.

14. The optical switch of claim 11 wherein the clock recovery circuit comprises a phase lock loop circuit.

15. The optical switch of claim 10 further comprising a bandpass filter in optical communication with the third port of the circulator.

16. The optical switch of claim 10 further comprising a bandpass filter in optical communication with the second port of the birefringent optical channel and the first port of the first coupler.

17. The optical switch of claim 1 further comprising a bandpass filter in optical communication with the second port of the birefringent optical channel and the first port of the first coupler.

18. The optical switch of claim 1 further comprising a polarization dependent beamsplitter having a first port adapted to receive the first optical pulse, a second port in optical communication with the first port of the birefringent optical channel and a third port to provide a second output optical pulse.

19. The optical switch of claim 18 wherein the polarization dependent beamsplitter has a transmission polarization axis and the birefringent optical channel has a fast axis and a slow axis, the transmission polarization axis being oriented at approximately 45° to the fast axis and the slow axis of the birefringent optical channel.

20. The optical switch of claim 1 further comprising a second coupler having a first port adapted to receive the second optical pulse, a second port adapted to receive a third optical pulse, and a third port in optical communication with the second port of the first coupler.

21. The optical switch of claim 20 further comprising an optical delay module in optical communication with the second port of the second coupler, the optical delay module delaying the third optical pulse relative to the second optical pulse by substantially the delay time.

22. An optical switch comprising:

a birefringent optical channel having a first port and a second port, the birefringent optical channel providing a first pair of orthogonally polarized optical pulses and a second pair of orthogonally polarized pulses at the second port in response to a first optical pulse and a second optical pulse, respectively, received at the first port, the first optical pulse and the second optical pulse being orthogonally polarized, each of the pulses in the first pair and the second pair of orthogonally polarized optical pulses being separated by a delay time;

a coupler having a first port in optical communication with the second port of the birefringent optical channel, a second port adapted to receive a third optical pulse, and a third port;

a nonlinear optical channel having a first port in optical communication with the third port of the coupler, and having a second port;

a polarization rotation mirror in optical communication with the second port of the nonlinear channel;

a polarization dependent beamsplitter having a first port, a second port in optical communication with the first port of the birefringent optical channel and a third port;

a first circulator having a first port adapted to receive the first optical pulse, a second port in optical communication with the first port of the polarization dependent beamsplitter and a third port adapted to provide a first optical output signal; and a second circulator having a first port adapted to receive the second optical pulse, a second port in optical communication with the third port of the polarization dependent beamsplitter and a third port adapted to provide a second optical output signal.

* * * * *

UNITED STATES PATENT AND TRADEMARK OFFICE
CERTIFICATE OF CORRECTION

PATENT NO. : 6,937,782 B2  
APPLICATION NO. : 10/420501  
DATED : August 30, 2005  
INVENTOR(S) : Bryan S. Robinson et al.

Page 1 of 1

It is certified that error appears in the above-identified patent and that said Letters Patent is hereby corrected as shown below:

Please delete the paragraph titled 'GOVERNMENT RIGHTS IN THE INVENTION', encompassing column 1, lines 14-17:

"This invention was made witht United States government support under Contract No. F19628-00-C-002 awarded by the Defense Advanced Research Project Agency (DARPA). The government may have certain rights in the invention."

and replace with:

--This invention was made with government support under Contract No. F19628-00-C-0002 awarded by the U.S. Air Force. The government has certain rights in this invention.--

Signed and Sealed this  
Ninth Day of October, 2012

David J. Kappos  
*Director of the United States Patent and Trademark Office*